(12) United States Patent
Sambuichi et al.

(10) Patent No.: US 11,522,405 B2
(45) Date of Patent: Dec. 6, 2022

(54) MOTOR

(71) Applicant: Nidec Corporation, Kyoto (JP)

(72) Inventors: Hiroshi Sambuichi, Kyoto (JP); Nakaba Kataoka, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 185 days.

(21) Appl. No.: 16/848,876

(22) Filed: Apr. 15, 2020

(65) Prior Publication Data

US 2020/0244141 A1 Jul. 30, 2020

Related U.S. Application Data

(63) Continuation of application No. 16/315,170, filed as application No. PCT/JP2017/026248 on Jul. 20, 2017, now Pat. No. 10,763,723.

(30) Foreign Application Priority Data

Jul. 20, 2016 (JP) .............................. JP2016-142199

(51) Int. Cl.
*H02K 5/22* (2006.01)
*H02K 5/10* (2006.01)

(52) U.S. Cl.
CPC ............... *H02K 5/225* (2013.01); *H02K 5/10* (2013.01); *H02K 5/22* (2013.01)

(58) Field of Classification Search
CPC ...... H02K 2203/09; H02K 5/225; H02K 3/50; H02K 3/52; H02K 3/521; H02K 5/22; H02K 5/10; H01R 13/5845; H01R 13/58
USPC ............................................. 310/71; 439/926
See application file for complete search history.

(56) References Cited

U.S. PATENT DOCUMENTS

| | | | | |
|---|---|---|---|---|
| 3,350,587 A | * | 10/1967 | Turk ...................... | H02K 5/225 310/71 |
| 3,541,493 A | * | 11/1970 | Morrill .................. | H02K 5/225 439/926 |
| 2006/0121773 A1 | * | 6/2006 | Ichikawa ........... | H01R 13/5216 439/408 |
| 2007/0273221 A1 | * | 11/2007 | Kinoshita .............. | H02K 5/207 310/58 |

(Continued)

FOREIGN PATENT DOCUMENTS

| | | |
|---|---|---|
| CN | 101079566 A | 11/2007 |
| CN | 101416369 A | 4/2009 |

(Continued)

OTHER PUBLICATIONS

JP-2002223552-A (English Translation) (Year: 2002).*

(Continued)

*Primary Examiner* — Thomas Truong
(74) *Attorney, Agent, or Firm* — Keating & Bennett (57) ABSTRACT

A motor for a driving device includes a rotor rotatable around a central axis, a stator facing the rotor, a busbar electrically connected to the stator, a busbar support to hold the busbar, a terminal bar including a first end electrically connected to the busbar, the terminal bar including a connection terminal at a second end and that is to be electrically connected to the driving device, and a seal to be attached to the driving device and located between the busbar and the connection terminal. The seal portion includes a through-hole into which the terminal bar is press-fitted.

15 Claims, 9 Drawing Sheets

(56) References Cited

U.S. PATENT DOCUMENTS

| | | | | |
|---|---|---|---|---|
| 2009/0025952 A1* | 1/2009 | Holmes | ............... | B60K 6/405 |
| | | | | 475/5 |
| 2009/0039720 A1 | 2/2009 | Tsukashima et al. | | |
| 2010/0187923 A1* | 7/2010 | Migita | ............... | H02K 3/522 |
| | | | | 174/68.2 |
| 2015/0162798 A1* | 6/2015 | Ozawa | ............... | H02K 11/225 |
| | | | | 310/43 |

FOREIGN PATENT DOCUMENTS

| | | | |
|---|---|---|---|
| CN | 203589341 U | | 5/2014 |
| JP | 2002223552 A | * | 8/2002 |
| JP | 2011-172374 A | | 9/2011 |
| WO | 2011/120107 A1 | | 10/2011 |

OTHER PUBLICATIONS

Sambuichi et al., "MOTOR", U.S. Appl. No. 16/315,170, filed Jan. 4, 2019.

Official Communication issued in corresponding Chinese Patent Application No. 202010273481.9, dated Dec. 31, 2021.

* cited by examiner

MOTOR

BACKGROUND OF THE INVENTION

1. Field of the Invention

The present disclosure relates to a motor.

2. Description of the Related Art

DE 10 2004 037 639 A1 discloses a motor that includes contact pins that are integrally connected to a power plug. The contact pins are electrically connected to a coil of a stator. The contact pins extend straightly from a position near one end portion of the stator in the axial direction toward one side in the axial direction.

It is desirable that a liquid, such as oil or water, does not flow into a plug portion to which a contact pin is connected. If the position of the stator is disposed apart from the position of the power plug, it is necessary to increase the length of the contact pin. If the length of the contact pin is increased, the position of the tip of the contact pin becomes unstable, and it may become difficult to fit the contact pin into the power plug.

SUMMARY OF THE INVENTION

A motor according to an exemplary embodiment of the present disclosure, which is a motor used for a driving device, includes a rotor that rotates around a central axis; a stator that faces the rotor; a busbar that is electrically connected to the stator; a busbar support that holds the busbar; a terminal bar that includes a first end that is electrically connected to the busbar, the terminal bar including a connection terminal that is disposed at a second end thereof and that is to be electrically connected to the driving device; and a seal that is to be attached to the driving device and that is disposed between the busbar and the connection terminal. The seal includes a through-hole into which the terminal bar is press-fitted.

With the exemplary embodiment of the present disclosure, it is possible to provide a motor that is used for a driving device and that is able to hermetically seal a terminal portion of the driving device. Moreover, with the exemplary embodiment of the present disclosure, it is possible to provide a motor that allows a connection terminal of the motor to be easily attached to the terminal portion of the driving device.

The above and other elements, features, steps, characteristics and advantages of the present disclosure will become more apparent from the following detailed description of the preferred embodiments with reference to the attached drawings.

DETAILED DESCRIPTION OF THE PREFERRED EMBODIMENTS

Hereinafter, exemplary embodiments of the present disclosure will be described in detail with reference to the drawings. In the present description, the direction in which the central axis A of the motor shown in FIG. 1 extends will be simply referred to as "the axial direction", and the radial direction and the circumferential direction that are centered on the central axis A of the motor will be simply referred to as "the radial direction" and "the circumferential direction".

Figure 1:
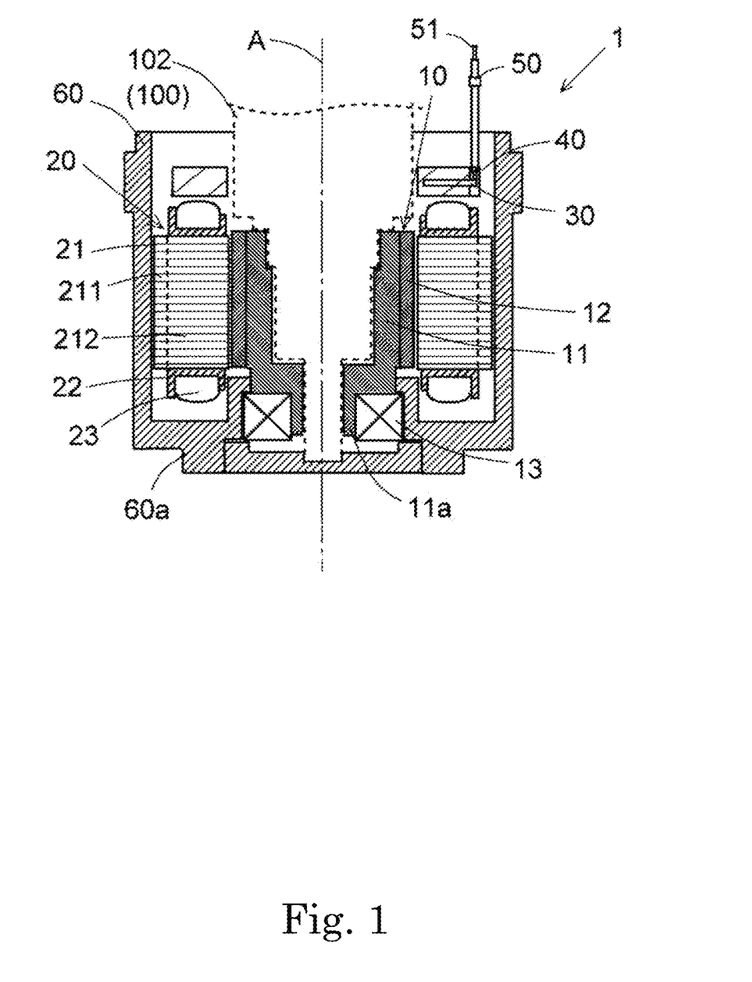
FIG. 1 is a schematic sectional view of a motor according to an exemplary embodiment of the present disclosure.

FIG. 1 is a schematic sectional view of a motor 1 according to an embodiment of the present disclosure. The motor 1 is used for a driving device. In the present embodiment, the driving device is an electric braking device, and the motor 1 is a brushless motor. However, a driving device for which a motor according to the present disclosure is used is not limited to an electric braking device. For example, a driving device for which a motor according to the present disclosure is used may be an electric power steering device or the like.

The motor 1 includes a rotor 10 that rotates around the central axis A. The rotor 10 includes a hollow shaft 11 that extends along the central axis A. To be specific, the hollow shaft has a structure such that two cylindrical portions having different outside diameters are arranged in the axial direction. Compared with the outside diameter of an end portion of the hollow shaft 11 on one side in the axial direction, the outside diameter of an end portion of the hollow shaft 11 on the other side in the axial direction is small. A cylindrical portion 11a, which is included in the end portion on the other side in the axial direction, is rotatably supported by a bearing 13 of the motor 1. The rotor 10 includes a magnet 12 that is disposed outside of the hollow shaft 11 in the radial direction. For example, the magnet 12 is fixed to the hollow shaft 11 by using a cover (not shown) that is disposed outside of the magnet 12 in the radial direction.

The motor 1 includes a stator 20 that faces the rotor 10. The stator 20 includes a stator core 21, an insulator 22, and a coil 23. The stator core 21 is formed by stacking a plurality of magnetic steel sheets in the axial direction. However, this is an example. For example, the stator core 21 may be formed of one member or may be formed by combining a plurality of members. An inner peripheral surface of the stator core 21 faces an outer peripheral surface of the rotor 10. The stator core 21 includes a core back 211, which has an annular shape, and teeth 212, which protrude from the core back 211 inward in the radial direction. The teeth 212 are arranged at regular intervals in the circumferential direction. The teeth 212 are covered by the insulator 22. For example, the insulator 22 is an insulating member such as a resin member. The coil 23 is formed by winding a conductor wire around each of the teeth 212 via the insulator 22.

The motor 1 includes a busbar 30, which is electrically connected to the stator 20, and a busbar support portion 40, which holds the busbar 30. The busbar support portion 40 is disposed so as to face an end portion of the stator 20 on one side in the axial direction. A lead wire extending from the coil 23 is electrically connected to the busbar 30, which is held by the busbar support portion 40. Details of the busbar 30 and the busbar support portion 40 will be described below.

The motor 1 includes a terminal bar 50 that has a first end portion E1 that is electrically connected to the busbar 30. The terminal bar 50 includes a connection terminal 51 that is disposed at a second end portion E2 thereof and that is to be electrically connected to the driving device. In the present embodiment, the terminal bar 50 extends toward one side in the axial direction. In the present embodiment, the first end portion E1 is an end portion on the other side in the axial direction, and the second end portion E2 is an end portion on the one side in the axial direction. The connection terminal 51 is a plate-shaped member made of a metal such as copper. Details of the terminal bar 50 will be described below.

Figure 2:
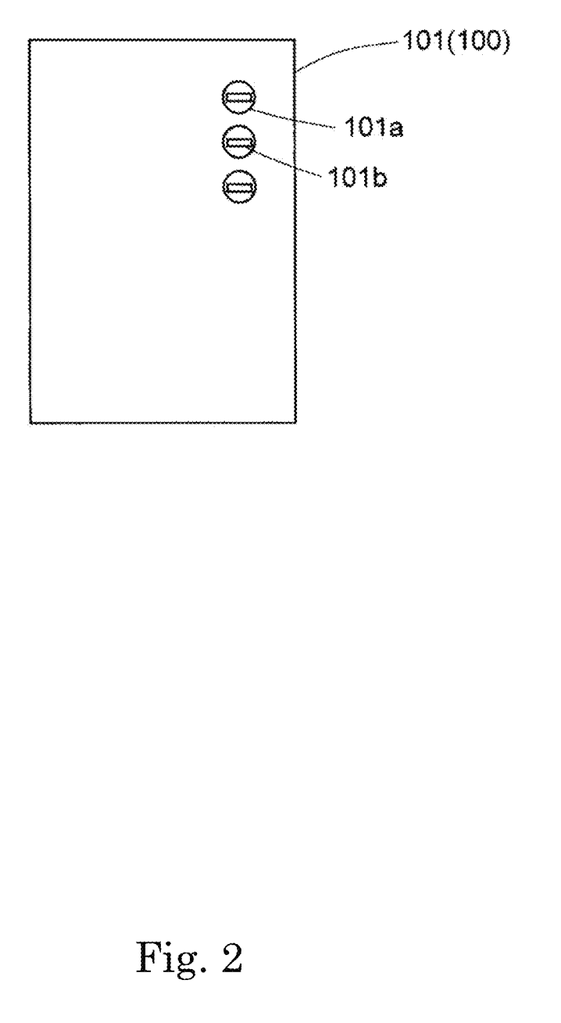
FIG. 2 is a schematic view of a controller of a driving device for which a motor according to an exemplary embodiment of the present disclosure is used.

FIG. 2 is a schematic view of a controller 101 of a driving device 100 for which the motor 1 according to the embodiment of the present disclosure is used. The controller 101 controls driving of the motor 1. In the present embodiment, the controller 101 is disposed so as to be separated from the motor 1 toward one side in the axial direction. The controller 101 has insertion holes 101a, in which terminal portions 101b are disposed. The controller 101 is disposed in an orientation such that the insertion holes 101a face the motor 1. The insertion holes 101a extend in the axial direction. The connection terminals 51 are inserted into the insertion holes 101a and are connected to the terminal portions 101b, which are disposed in the insertion holes 101a. Thus, electric power is supplied to the coil 23 from the controller 101 via the terminal bars 50 and the busbars 30.

The motor 1 includes a housing 60, which extends in the axial direction and which has a substantially cylindrical shape having a bottom. A bottom wall 60a of the housing 60 is positioned on the other side in the axial direction. The housing 60 is disposed outside of the stator 20 in the radial direction and surrounds the stator 20. The bearing 13 is fixed to a central portion of the housing 60 on the bottom wall side.

The motor 1 drives a piston mechanism 102 of the driving device 100. The piston mechanism 102 includes a ball screw, a piston, and a cylinder, which are not shown in the figures. When the motor 1 is driven, the hollow shaft 11 rotates. When the hollow shaft 11 rotates, the ball screw is driven, and the position of the piston in the cylinder varies in the axial direction. When the piston is driven, a braking pressure varies.

Figure 3:
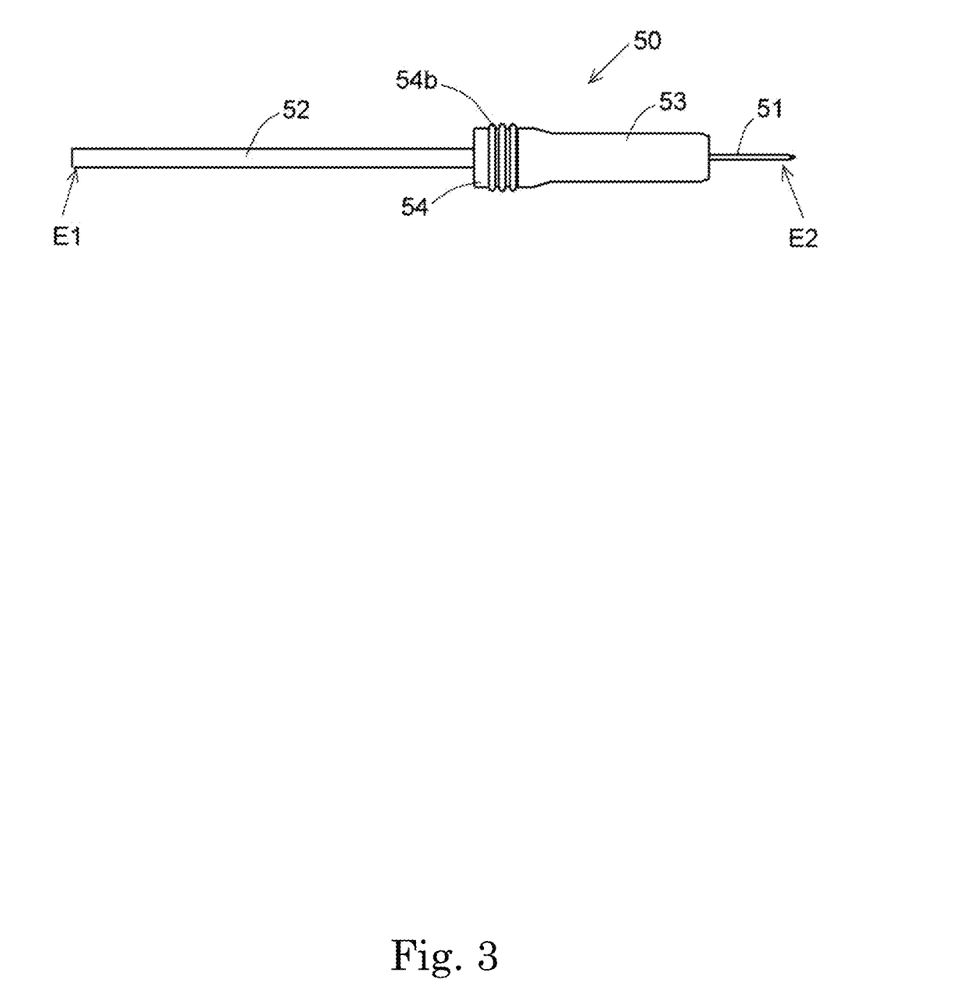
FIG. 3 is a schematic side view of a terminal bar of a motor according to an exemplary embodiment of the present disclosure.

FIG. 3 is a schematic side view of the terminal bar 50 of the motor 1 according to the embodiment of the present disclosure. The terminal bar 50 includes, in addition to the connection terminal 51, a bar-shaped portion 52 and a mold portion 53. The bar-shaped portion 52 is located between the busbar 30 and the connection terminal 51. The bar-shaped portion 52 is a round bar made of a metal such as copper. The mold portion 53 covers a part of the bar-shaped portion 52 and a part the connection terminal 51 while electrically connecting the bar-shaped portion 52 and the connection terminal 51 to each other. The mold portion 53 is made of an insulating resin.

Figure 4:
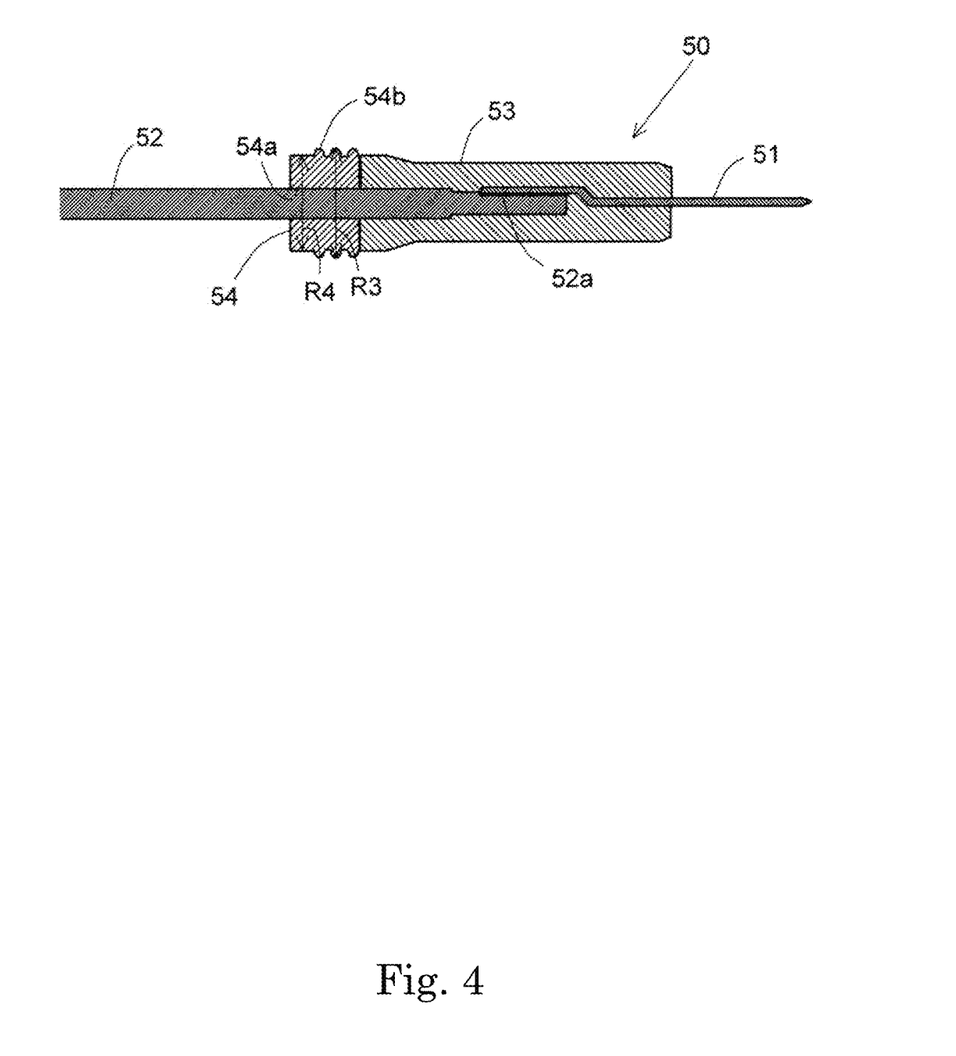
FIG. 4 is a partial schematic sectional view of a terminal bar of a motor according to an exemplary embodiment of the present disclosure.

FIG. 4 is a partial schematic sectional view of the terminal bar 50 of the motor 1 according to the embodiment of the present disclosure. As illustrated in FIG. 4, one end portion of the connection terminal 51 and one end portion of the bar-shaped portion 52 overlap, and the connection terminal 51 and the bar-shaped portion 52 are connected to each other. In the present embodiment, a flat portion 52a is formed at the one end portion of the bar-shaped portion 52. This makes it easier to connect the connection terminal 51 to the bar-shaped portion 52.

The mold portion 53 covers a part of the connection terminal 51 and a part of the bar-shaped portion 52, the parts including connection portions where the connection terminal 51 and the bar-shaped portion 52 are connected to each other. Thus, the connection terminal 51 and the bar-shaped portion 52 are fixed to each other in a connected state, and the connection terminal 51 and the bar-shaped portion 52 are electrically connected to each other. In the present embodiment, the mold portion 53 has a substantially cylindrical shape. To be more specific, the outside diameter of an end portion of the mold portion 53 on the bar-shaped portion 52 side is larger than the outside diameter of an end portion of the mold portion 53 on the connection terminal 51 side. Thus, the contact area of an end surface of the mold portion 53 on the bar-shaped portion 52 side can be increased.

The motor 1 includes a seal portion 54 that is disposed between the busbar 30 and the connection terminal 51. The seal portion 54 is to be attached to the driving device 100. In the present embodiment, the seal portion 54 is to be attached to the controller 101 of the driving device 100. The relationship between the seal portion 54 and the controller 101 will be described below.

The seal portion 54 is made of an elastic material such as rubber. The seal portion 54 has a through-hole 54a into which the terminal bar 50 is press-fitted. To be specific, the diameter of the through-hole 54a is smaller than the diameter of the bar-shaped portion 52. The bar-shaped portion 52 is press-fitted into the through-hole 54a. That is, the seal portion 54 is attached to the bar-shaped portion 52. To be more specific, the seal portion 54 is in contact with the end portion of the mold portion 53 on the bar-shaped portion 52 side. With this structure, the position of the seal portion 54, into which the bar-shaped portion 52 is press-fitted, can be determined by using the mold portion 53, and manufacturing of the terminal bar 50 can be facilitated.

The seal portion 54 includes at least one protruding portion 54b that extends one turn along an outer peripheral surface of the seal portion 54. In other words, the seal portion 54 includes at least one protruding portion 54b that is ring-shaped. In the present embodiment, the seal portion 54 includes three protruding portions 54b. The three protruding portions 54b are disposed with spaces therebetween. By forming the protruding portions 54b, workability when inserting the terminal bar 50 into the insertion hole 101a can be improved, and the seal portion 54 can closely contact an inner wall of the insertion hole 101a. Preferably, the seal portion 54 includes a plurality of the protruding portions 54b in order that the seal portion 54 can closely contact the inner wall of the insertion hole 101a.

Figure 5:
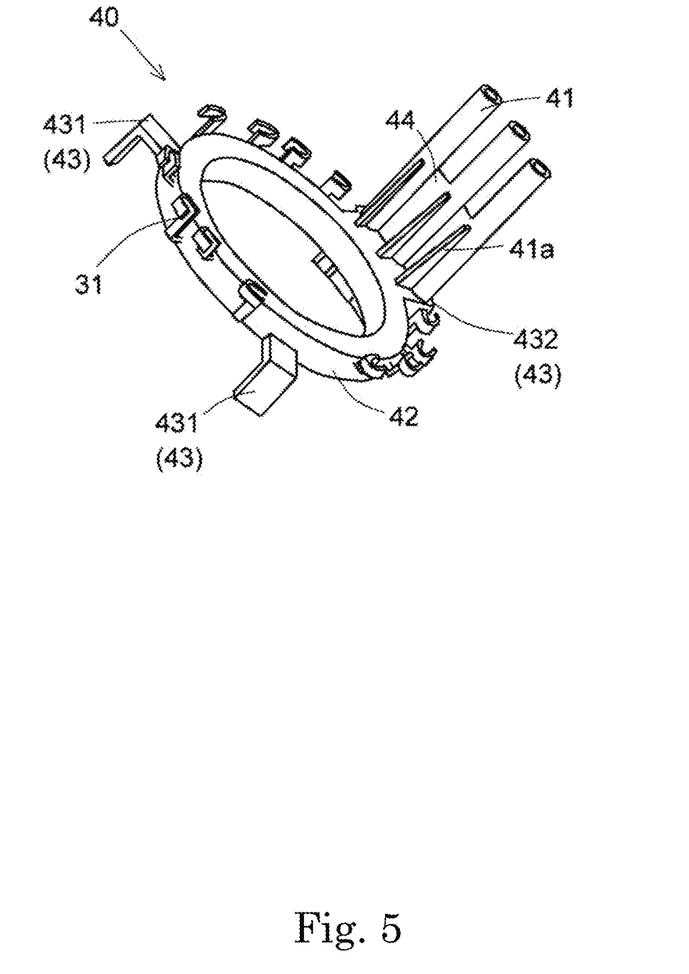
FIG. 5 is a schematic perspective view of a busbar support portion of a motor according to an exemplary embodiment of the present disclosure.

FIG. 5 is a schematic perspective view of the busbar support portion 40 of the motor 1 according to the embodiment of the present disclosure. As illustrated in FIG. 5, the busbar support portion 40 includes tubular portions 41 and a holding portion 42. In the present embodiment, the tubular portions 41 and the holding portion 42 are integrally formed. The busbar support portion 40 is made of an insulating resin.

The bar-shaped portion 52 is inserted into each of the tubular portions 41. In the present embodiment, the tubular portions 41 each have a cylindrical shape. The busbar support portion 40 includes the plurality of tubular portions 41. In the present embodiment, the motor 1 has the coil 23 having three phases, which are the U-phase, the V-phase, and the W-phase. Therefore, the controller 101 includes three terminal portions 101b, and the motor 1 includes three terminal bars 50. Because there are three terminal bars 50, the busbar support portion 40 includes three tubular portions 41, which are arranged in the circumferential direction. Each of the tubular portions 41 extends toward one side in the axial direction. The tubular portion 41 can stabilize the position of the terminal bar 50, which extends toward the one side in the axial direction.

The holding portion 42 holds the busbar 30. The tubular portion 41 protrudes from the holding portion 42. In the present embodiment, the holding portion 42 has an annular shape. The tubular portion 41 protrudes from the holding portion 42 toward one side in the axial direction. The holding portion 42 is integrated with the busbar 30 by insertion molding. The busbar 30 includes a hook portion 31 that protrudes from an outer peripheral surface of the holding portion 42. A lead wire (not shown), which extends from the coil 23, is attached to the hook portion 31. The lead wire and the busbar 30 are electrically connected to each other. The number of hook portions 31 may be changed as appropriate in accordance with the wiring structure of the coil 23.

In the present embodiment, the busbar 30 includes four types of busbars, which are a busbar for the U-phase, a busbar for the V-phase, a busbar for the W-phase, and a busbar for the neutral point. However, this is an example, and, if the coil 23 is formed by delta connection instead of star connection, the busbar for the neutral point may be omitted. The plurality of types of busbars are structured so that a busbar of one type do not contact a busbar of any other type. For example, the height positions of the busbars are changed in accordance with the types.

The holding portion 42 includes an L-shaped leg portion 43 that protrudes outward in the radial direction from an annular body portion thereof. The leg portion 43 determines the height of the busbar support portion 40 relative to the stator 20 in the axial direction. In the present embodiment, the holding portion 42 includes three leg portions 43. The three leg portions 43 are arranged at substantially regular intervals in the circumferential direction. To be specific, the three leg portions 43 include two first leg portions 431, which have the same shape, and a second leg portion 432, whose width in the circumferential direction is larger than that of each of the first leg portions 431. The three tubular portions 41 are disposed on the second leg portion 432.

As illustrated in FIG. 5, each of the tubular portions 41 includes a rib 41a on an outer surface thereof. The rib 41a extends in the axial direction. In the present embodiment, the rib 41a is a plate-shaped member having a trapezoidal shape. The rib 41a extends in the axial direction from an end portion of the tubular portion 41 on the second leg portion 432 side to a central portion of the tubular portion 41. The rib 41a protrudes from the tubular portion 41 inward in the radial direction. The width of an end portion of the rib 41a on the second leg portion 432 side in the axial direction is larger than the width of an end portion of the rib 41a on the opposite side. Preferably, the rib 41a and the tubular portion 41 are integrally formed. The rib 41a can increase the strength of the tubular portion 41 and stabilize the position of the tubular portion 41.

As illustrated in FIG. 5, each adjacent pair of the plurality of tubular portions 41 are coupled to each other by a coupling piece 44. In the present embodiment, the coupling piece 44 has a rectangular plate-like shape, and the number of coupling pieces 44 is two. The coupling piece 44 extends in the axial direction from an end portion of the tubular portion 41 on the second leg portion 432 side to a central portion of the tubular portion 41. Preferably, the coupling piece 44 and the tubular portion 41 are integrally formed. The coupling pieces 44 can increase the strength of the plurality of tubular portions 41 and can keep the positional relationship between the plurality of tubular portions 41.

Figure 6:
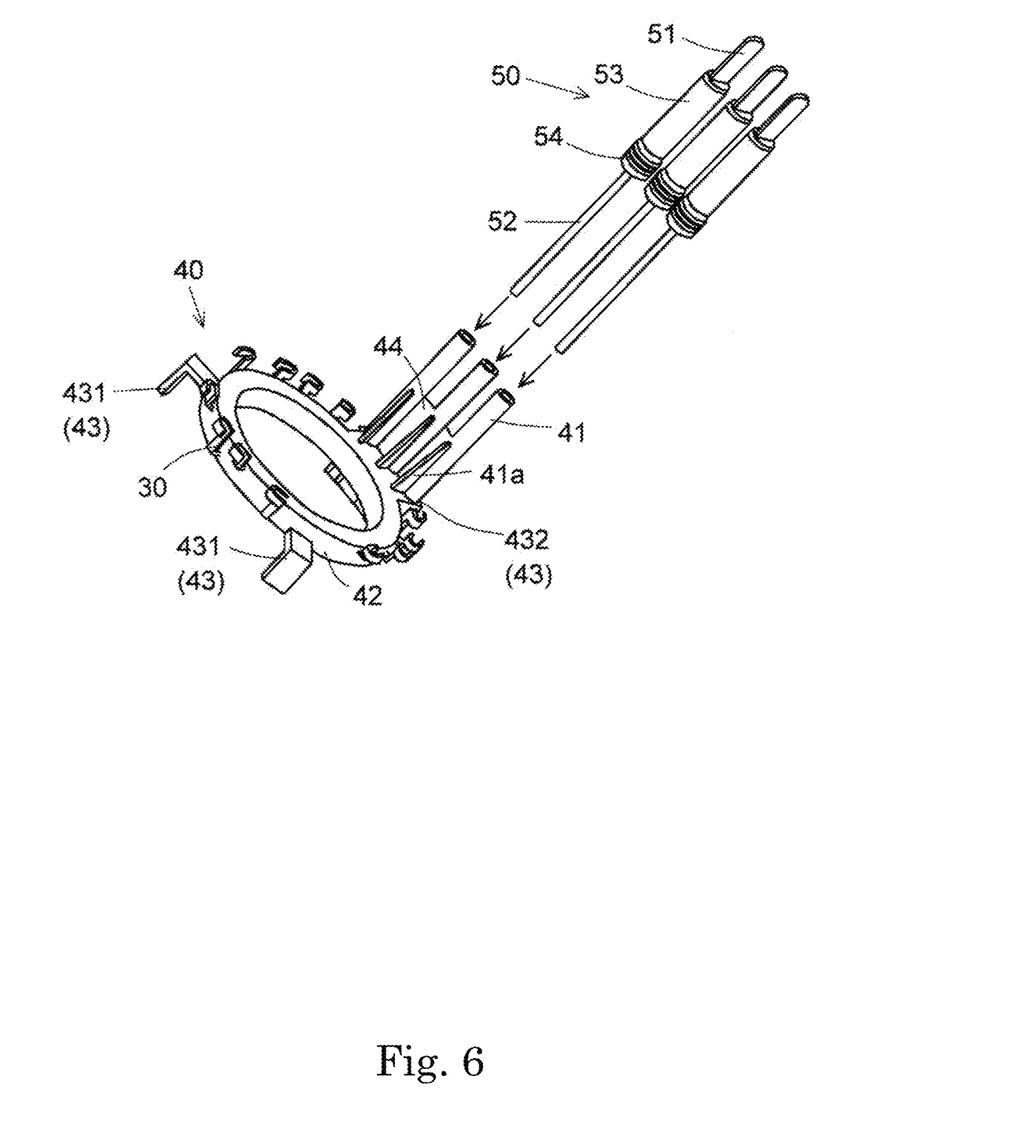
FIG. 6 is a schematic perspective view illustrating the relationship between terminal bars and the busbar support portion before the terminal bars are attached to the busbar support portion.
Figure 7:
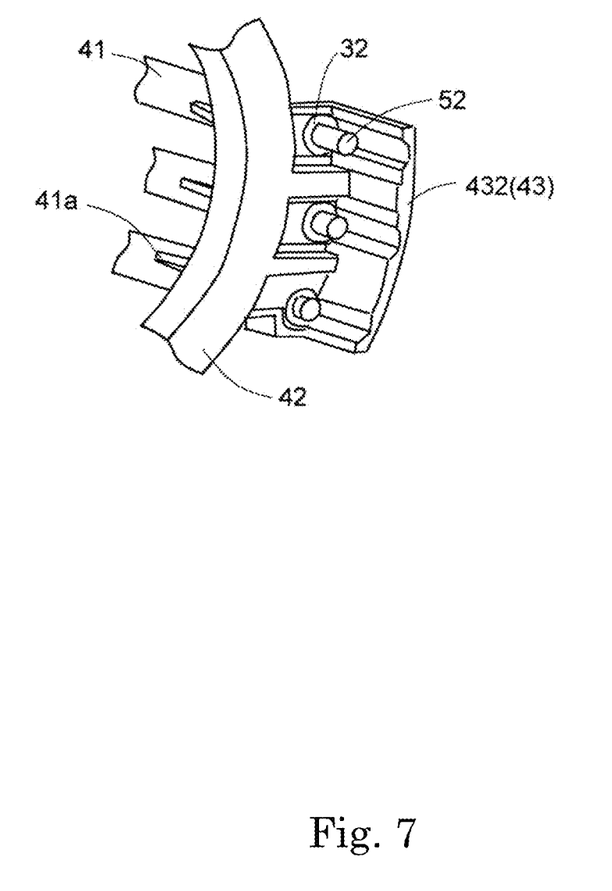
FIG. 7 is a schematic perspective view illustrating the relationship between the terminal bars and the busbar support portion after the terminal bars have been attached to the busbar support portion.

FIG. 6 is a schematic perspective view illustrating the relationship between the terminal bars 50 and the busbar support portion 40 before the terminal bars 50 are attached to the busbar support portion 40. FIG. 7 is a schematic perspective view illustrating the relationship between the terminal bars 50 and the busbar support portion 40 after the terminal bars 50 have been attached to the busbar support portion 40. FIG. 7 illustrates a part of the busbar support portion 40 and parts the terminal bars 50.

As illustrated in FIG. 6, the three terminal bars 50 are each inserted into a corresponding one of the tubular portions 41 from an end portion thereof on a side opposite to the connection terminal 51 side. The bar-shaped portion 52 of each of the terminal bars 50 is inserted into a corresponding one of the tubular portions 41. As illustrated in FIG. 7, the busbars 30 are electrically connected to the bar-shaped portions 52 on the base side of the tubular portions 41. Because the busbars 30 are held by the holding portion 42, connection portions can be easily disposed on the base side of the tubular portions 41. Therefore, with the structure of the present embodiment, it is easy to electrically connect the busbars 30 and the terminal bars 50 to each other.

In the present embodiment, a connection portion 32 of each of the busbars 30 is disposed on the second leg portion 432. The connection portion 32 is a part of the busbar 30 that protrudes from the annular body portion of the holding portion 42 outward in the radial direction. To be specific, on the second leg portion 432, three connection portions 32, which are a connection portion for the U-phase, a connection portion for the V-phase, and a connection portion for the W-phase, are disposed. The connection portions 32 are disposed on the base side of the tubular portions 41 at positions that are arranged adjacent to the tubular portions 41 in the axial direction. Each of the connection portions 32 has a cylindrical shape. As illustrated in FIG. 7, end portions of the bar-shaped portions 52, which are inserted into the tubular portions 41, are inserted into the connection portions 32. The bar-shaped portions 52, which are inserted into the connection portions 32, are electrically connected to the busbars 30 by, for example, being welded.

With the structure of the present embodiment, end portions of the terminal bars 50 can be guided to the connection portions 32 while determining the positions of the terminal bars 50 by using the tubular portions 41. Therefore, the terminal bars 50 and the busbars 30 can be electrically connected to each other easily. Moreover, because the direction in which the terminal bars 50 extend is guided by the tubular portions 41, the positions of the terminal bars 50, including the positions of the connection terminals 51 on the tip end side, can be stabilized. The structure according to the present embodiment is particularly effective in a case where the distance between the motor 1 and the controller 101 is large and the length of the terminal bar 50 is large.

Figure 8:
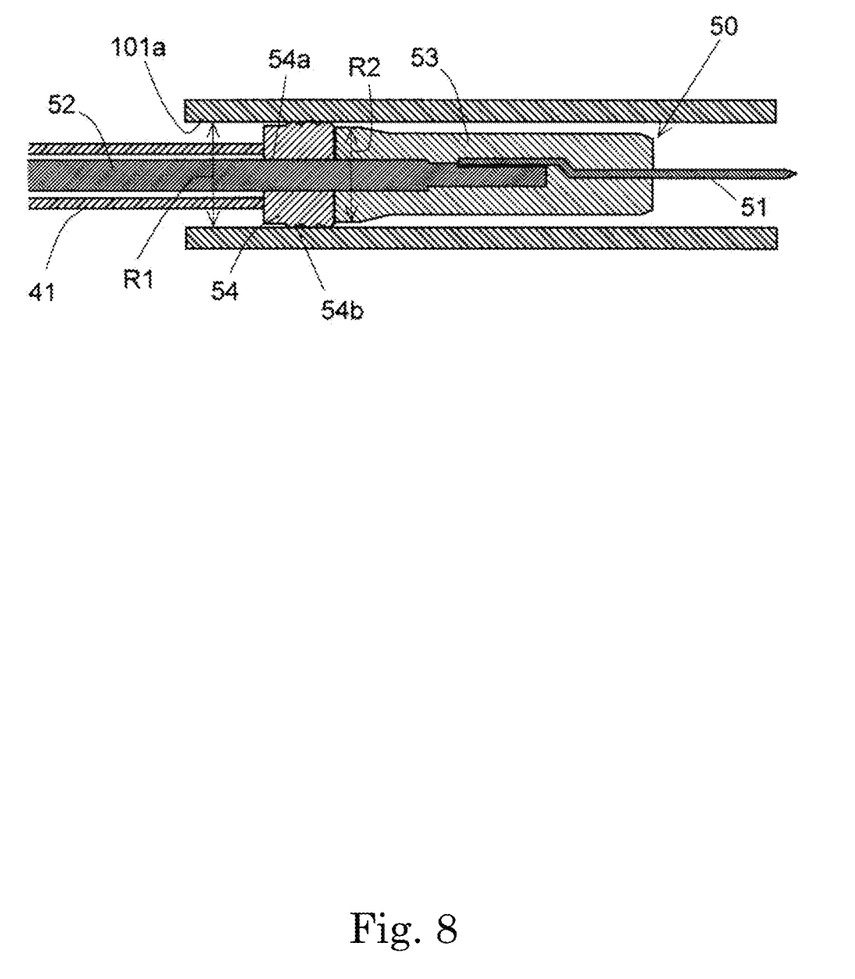
FIG. 8 is a schematic sectional view illustrating a state in which a portion of a terminal bar is inserted into an insertion hole.

FIG. 8 is a schematic sectional view illustrating a state in which a part of the terminal bar 50 is inserted into the insertion hole 101a. In order to connect the terminal portion 101b (see FIG. 2) and the connection terminal 51, a part of the terminal bar 50 on the connection terminal 51 side is inserted into the insertion hole 101a. Thus, the seal portion 54, which is attached to the terminal bar 50, is attached to an inner wall of the insertion hole 101a. The seal portion 54 closely contacts the bar-shaped portion 52 and the inner wall of the insertion hole 101a. Therefore, the terminal portion 101b is hermetically sealed by the seal portion 54. That is, a liquid, such as oil or water, can be prevented from flowing into the terminal portion 101b.

To be specific, the inside diameter R1 of the insertion hole 101a is larger than the maximum outside diameter R2 of the mold portion 53. The inside diameter R1 of the insertion hole 101a is smaller than the outside diameter R3 (see FIG. 4) of a part of the seal portion 54 on which the protruding portion 54b is formed. The inside diameter R1 of the insertion hole 101a is larger than the outside diameter R4 (see FIG. 4) of a part of the seal portion 54 on which the protruding portion 54b is not formed.

Due to the relationship R1>R2, a tip end portion of the terminal bar 50, including the mold portion 53, can be easily inserted into the insertion hole 101a. Due to the relationships R1<R3 and R1>R4, the seal portion 54 is inserted into the insertion hole 101a while the protruding portion 54b is being compressed. Because the protruding portion 54b is compressed, the seal portion 54 comes into close contact with the inner wall of the insertion hole 101a. Moreover, the bar-shaped portion 52 has been press-fitted into the through-hole 54a of the seal portion 54. Therefore, the seal portion 54 hermetically seals the terminal portion 101b; and a liquid, such as oil or water, can be prevented from flowing into the terminal portion 101b. The protruding portion 54b may be omitted. However, in this case, in order to make the seal portion 54 closely contact the inner wall of the insertion hole 101a, workability of the operation of inserting the seal portion 54 into the insertion hole 101a decreases. Therefore, preferably, the seal portion 54 has the protruding portion 54b.

Figure 9:
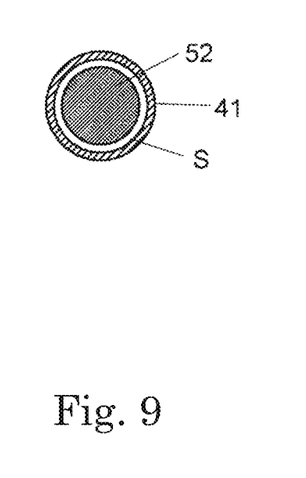
FIG. 9 is a schematic sectional view illustrating the relationship between a bar-shaped portion and a tubular portion.

FIG. 9 is a schematic sectional view illustrating the relationship between the bar-shaped portion 52 and the tubular portion 41. As illustrated in FIG. 9, a gap S is formed between the tubular portion 41 and the bar-shaped portion 52, which is inserted into the tubular portion 41. In the present embodiment, the outside diameter of the bar-shaped portion 52 is smaller than the inside diameter of the tubular portion 41. Therefore, the gap S is formed. Because the gap S is formed, the terminal bar 50 can move in an in-plane direction that is perpendicular to the axial direction. Thus, it is possible to connect the connection terminal 51 to the terminal portion 101b while adjusting the position of the terminal bar 50, and it is possible to easily attach the connection terminal 51 to the terminal portion 101b. The structure of the present embodiment is particularly effective in a case where the distance between the motor 1 and the controller 101 is large and the length of the terminal bar 50 is large.

The structure of the embodiment described above is only an example of the present disclosure. The structure of the embodiment may be modified as appropriate within the technical scope of the present disclosure. The embodiment and minor modifications of the embodiment may be used in combination where feasible.

In the structure described above, the terminal bar 50 extends in the axial direction. However, this is only an example. For example, the terminal bar 50 may extend in the radial direction. In this case, the tubular portion 41 may also extend in the radial direction instead of the axial direction.

The present disclosure is widely applicable to a motor that is used, for example, for household electrical appliances, automobiles, ships, aircrafts, and trains.

Features of the above-described preferred embodiments and the modifications thereof may be combined appropriately as long as no conflict arises.

While preferred embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

What is claimed is:

1. A motor for use in a driving device, the motor comprising:
   a rotor that is rotatable around a central axis;
   a stator that opposes the rotor;
   a busbar that is connected electrically to the stator;
   a busbar support portion that includes a holding portion that holds the busbar and a tubular portion that protrudes from the holding portion; and
   a terminal bar that is inserted into the tubular portion and connects electrically the terminal bar to the busbar; wherein
   the busbar support portion opposes an end of the stator on one side in an axial direction, and the tubular portion extends towards the one side in the axial direction which extends in parallel or substantially in parallel with the central axis;
   the terminal bar includes a first end portion that is connected electrically to the busbar, and a connection terminal that is at a second end portion thereof and is connectable electrically to the driving device;
   the busbar includes a connection portion that protrudes from an annular body portion of the holding portion outward in a radial direction;
   the connection portion is uncovered by the busbar support portion and exposed to another side in the axial direction which is opposite to the one side in the axial direction; and
   the first end portion extends towards the another side in the axial direction and is connected electrically to the connection portion.

2. The motor according to claim 1, wherein
   the terminal bar further includes:
      a bar-shaped portion located between the bulbar and the connection terminal; and
      a mold portion that covers a portion of the bar-shaped portion and a portion of the connection terminal while connecting electrically the bar-shaped portion and the connection terminal to each other.

3. The motor according to claim 2, wherein
   the bar-shaped portion is inserted into the tubular portion.

4. The motor according to claim 3, wherein
   a gap is located between the tubular portion and the bar-shaped portion.

5. The motor according to claim 3, wherein
   the tubular portion includes a rib on an outer surface thereof, the rib extending in an axial direction which extends in parallel or substantially in parallel with the central axis.

6. The motor according to claim 3, wherein
the bulbar support portion includes a plurality of the tubular portions; and
each adjacent pair of the plurality of tubular portions are coupled to each other by a coupler.

7. The motor according to claim 6, wherein
the coupler extends from one side of the busbar support portion in the axial direction to another side of the busbar support portion in the axial direction.

8. The motor according to claim 2, wherein
the bar-shaped portion includes a flat portion; and
the flat portion and the connection terminal are connected to each other.

9. The motor according to claim 2, wherein
an outside diameter of a bar-shaped portion side of the mold portion is larger than an outside diameter of an end portion of a connection terminal side of the mold portion.

10. The motor according to claim 2, wherein
an outside diameter of the mold portion is larger than an outside diameter of the tubular portion.

11. The motor according to claim 1, wherein
the holding portion includes an L-shaped leg portion that protrudes outward in a radial direction from an annular body portion of the holding portion.

12. The motor according to claim 11, wherein
the leg portion includes two first leg portions which have a same shape, and a second leg portion; and
a width of the second leg portion in a circumferential direction is larger than that of each of the first leg portions.

13. The motor according to claim 12, wherein
the tubular portion is on the second leg portion.

14. The motor according to claim 13, wherein
the second leg portion includes a radial portion extending in the radial direction, and an axial portion extending in the axial direction from the radial portion; and
the connection portion is on the radial portion and inward from the leg in the radial direction.

15. The motor according to claim 1, wherein
the terminal bar passes through an opening defined in the connection portion of the busbar such that portions of the terminal bar are located at positions axially above and axially below the connection portion of the busbar.

* * * * *